United States Patent Office 3,770,650
Patented Nov. 6, 1973

3,770,650
PROCESS FOR PREPARING A CONCENTRATED COLLOIDAL SILICON DIOXIDE SOLUTION
Johannes Ebregt, Heilo, Netherlands, assignor to Akzo N.V., Arnhem, Netherlands
No Drawing. Filed June 16, 1971, Ser. No. 153,901
Claims priority, application Netherlands, June 26, 1970, 7009423
Int. Cl. B01j 13/00; C01b 33/14
U.S. Cl. 252—313 S          7 Claims

ABSTRACT OF THE DISCLOSURE

In the process for preparing concentrated colloidal silicon dioxide solutions by mixing an aqueous alkali-metal silicate solution with an aqueous silicon dioxide sol and then passing the resulting reaction mixture through an ion exchanger in the hydrogen form so that the effluent of the latter is a silicon dioxide sol which may be mixed with additional alkali-metal silicate solution and recirculated through the exchanger until the effluent attains a desired silicon dioxide content; the stability of the resulting sols is improved and the further concentration thereof, as by evaporation, is facilitated by maintaining constant the rates of addition of the alkali-metal silicate solution and of passage of the reaction mixture through the exchanger, at least until the effluent of the latter has a silicon dioxide content of approximately 4 percent by weight, by maintaining the temperature of the reaction mixture in the range between 60 and 100° C. and its pH value in the range from 6 to 10, and by selecting the silicon dioxide content and rate of addition of the alkali-metal silicate solution and the quantity of water in the system so that the rate of increase of silicon dioxide in the effluent from the exchanger, in percent by weight per minute, is in the range between 0.03 and 1.0, and preferably between 0.05 and 0.5.

---

This invention relates generally to the concentration of colloidal silicon dioxide solutions, and more particularly is directed to improvements in the process which attains that purpose by continuously mixing an aqueous alkali-metal silicate solution and an aqueous silicon dioxide sol, passing the resulting reaction mixture continuously through an ion exchanger in the hydrogen form, mixing the silicon dioxide sol effluent with new alkali-metal silicate solution, and repeating the cycle one or more times until the effluent has reached the required silicon dioxide content.

A process of the type described above is already known, for example, as in U.S. Pat. No. 2,727,008. The process for preparing a concentrated metastable silicon dioxide sol, as disclosed in that patent, starts with a silicon dioxide sol which contains a maximum of 4% by weight of $SiO_2$ and which has silicon dioxide particles of a diameter less than 4 m$\mu$. This sol is mixed, at a temperature below 60° C. and with vigorous agitation, with an amount of an alkali-metal silicate solution having a silicon dioxide content of 10 to 36% by weight, such that the alkali-metal ion concentration in the mixture is thus not more than 40% of normal. The mixture is passed through an ion exchanger in the hydrogen form. The silicon dioxide sol effluent is again mixed with the alkali-metal silicate solution and the cycle is repeated. After a number of cycles, the concentrated silicon dioxide sol is obtained with a silicon dioxide content of 10 to 20% by weight. The size of the sol particles in the solution concentrated in this way is increased only slightly and varies between 4 and 7 to 10 m$\mu$. This means that the concentration of the sol is accomplished more by an increase in the number of particles than by a growth of any of the particles originally present.

The resulting concentrated sols are metastable and it is practically impossible to concentrate them further by normal evaporation without their gelling. To make more highly concentrated silicon dioxide sols from these metastable concentrates, it is necessary to use relatively complicated procedures, for example, as disclosed by Bechtold and Snyder in U.S. Pat. No. 2,574,902, in which, as the sol is evaporated, the volume remains constant and the size of the individual particles increases.

It is an object of this invention to provide a process by which stable concentrated silicon dioxide sols can be readily prepared with sol particles of substantially identical sizes, while making it possible to vary the particle size within wide limits.

Another object is to provide a process, as aforesaid, in which the resulting concentrates, for example, having a silicon dioxide content of 10–20% by weight, can readily be processed, for instance simply by evaporation, to form stable concentrates having a silicon dioxide content of 40 to 50% by weight, while the particle size remains substantially the same and no gelling occurs.

In accordance with this invention, in a process for the preparation of a concentrated colloidal silicon dioxide solution by continuously mixing an aqueous alkali-metal silicate solution and an aqueous silicon dioxide sol, passing the resulting reaction mixture continuously through an exchanger in the hydrogen form, mixing the silicon dioxide sol effluent with new alkali-metal silicate solution, and repeating the cycle one or more times until the effluent has reached the required silicon dioxide content; at the time of start-up of the process, an alkali-metal silicate solution is added at a temperature of 60 to 100° C. continuously and, at least initially, at a constant speed, to a predetermined quantity of water in the system, the resulting mixture is passed continuously and, at least initially, at a constant speed, through the ion exchanger, to provide as the effluent from the latter the silicon dioxide sol mixed with the alkali-metal silicate solution to constitute the reaction mixture which is adjusted to a pH of between 6 and 10 by means of the continuously introduced alkali-metal silicate solution, the temperature of the reaction mixture is maintained in the range from 60 to less than 100° C. and the rate at which the silicon dioxide concentration in the effluent increases, in percent by weight per minute is held to a value between 0.03 and 1.0 by suitably selecting the silicon dioxide content and rate of introduction of the alkali-metal silicate solution and the quantity of water in the system or cycle.

More particularly, it has been found that, in the above described process, the rate of increase $(dc/dt)_{t=0}$ of the silicon dioxide concentration in the effluent from the ion exchanger can be expressed as follows:

$$1.0 \geq \left(\frac{dc}{dt}\right)_{t=0} = \frac{a \cdot V}{G_o} \geq 0.03$$

in which:
$a$ is the silicon dioxide content, in percent by weight, of the alkali-metal silicate solution,
V is the rate, in g. per minute, at which the continuously supplied alkali-metal silicate solution is introduced, and
$G_o$ is the predetermined amount of water, by weight in grams, contained in the cycle or system at the time of start-up.

Apart from its simple performance, the process according to the invention is distinguished by its high degree of flexibility, which permits concentrated silicon dioxide sols to be prepared with different silicon dioxide contents and different, but substantially uniform particle sizes.

For example, selection of the value of $$\frac{aV}{G_o}$$

and the temperature of the reaction mixture permits the number of sol particles forming to be controlled, whereas, for a given final concentration, the particle size of the end product can be controlled by selecting the rate at which the reaction mixture is passed through the ion exchanger. Increasing the rate of circulation of the reaction mixture through the exchanger reduces the number of particles, so that, for a given end concentration of the sol, the dimensions of these substantially uniform particles of reduced number are thus greater. Of course, in selecting these conditions, it is necessary to satisfy all of the above characterising features of the process according to the invention, for example the pH range required. In the case outlined above, the rate of circulation cannot be increased unrestrictedly, since it would cause such a lowering of the pH that the latter would no longer be within the required range.

The number of particles formed in the end product can also, for example, be increased for a given reaction mixture temperature and a given rate of circulation, by selecting a higher value for $$\frac{aV}{G_o}$$

Such higher value of the latter results in an end product having a larger number of particles, that is, particles having smaller dimensions for a given final concentration. Preferably, the value of $$\frac{aV}{G_o}$$

is 0.05 to 0.5. Values of less than 0.03 are unusable in practice, since the total process time for concentrating the silicon dioxide sol becomes uneconomically long. On the other hand, it is not possible to use $$\frac{aV}{G_o}$$

values of more than 1.0, since, in order to keep the pH of the reaction mixture within the required limits, the rate of circulation through the ion exchanger would have to be increased to such a high value that it would be impossible to achieve in practice.

The number of particles formed can also be increased by using a lower temperature for the reaction mixture, the other process conditions remaining equal. However, reaction mixture tempearture below 60° C. are unsuitable, because of the uneconomically long process time required. Further, temperatures below 60° C. promote the formation of many unstable smaller particles, as in the process disclosed in the above mentioned U.S. Pat. No. 2,727,008. Temperatures above 100° C. are also undesirable because of the resulting gas formation in the system, which may have a disturbing effect, particularly in the ion exchanger. Preferably, the reaction mixture has a temperature of 75 to 90° C.

Further, in the process according to this invention, only slow or gentle mixing or agitation of the contents of the reaction vessel is required, as distinguished from the process in U.S. Pat. No. 2,727,008, in which intense or vigorous agitation is required in connection with the mixing of the silicate and silica sol.

Since it is essential that a specific number of sol particles should be formed initially in the method according to the invention, and then increased in size until the particles of the finally required sizes have been obtained, the introduction of the alkali-metal silicate solution should be carried out at a constant speed, in any case at the beginning of the cycle. For the same reason, the reaction mixture should be passed at a constant speed through the ion exchanger, at least initially. Quite soon after the beginning of the process, generally immediately upon the silicon dioxide content of the sol that has formed in the meantime attaining a value of about 4% by weight, it is no longer necessary to keep constant the speed at which the alkali-metal silicate solution is introduced and the speed at which the reaction mixture is passed through the ion exchanger. Beyond the mentioned initial stage, these speeds have little or no effect on the number of sol particles forming. The subsequent increase in the silicon dioxide content is thus caused practically entirely by the increase in size of the sol particles that have already formed, and not by the formation of new sol particles.

The cation exchange resins that can be used in the present process may be of the strongly acidic type, of the weakly acidic type or of any intermediate type or combination. Such cation exchange resins are well known materials, for example, the styrene and divinyl benzene based sulphonated polymerization products which have been further treated with suitable acids to provide the hydrogen or $H^+$ form of the resin. Commercially available materials include, for example, IMAC C12, IMAC C16P and IMAC 25, produced by Industrieele Maatschappij Activit N.V., Amsterdam, Netherlands; Amberlite IRC 120 and Amberlite 200, produced by Rohm & Hass Co., Philadelphia, Pa., U.S.A.; and Lewatit S 100 and Lewatit SP 100, produced by Farben fabrik Bayer A.G., Leverkusen, Germany.

Preferably, use is made of a strongly acidic cation exchange resin in the hydrogen form, such as IMAC C16P, which is a high capacity, strongly acidic nuclear sulfonic acid type cation exchange resin.

The invention will be further described with reference to the following examples which are intended to be merely illustrative:

EXAMPLE I

For the preparation of a colloidal silicon dioxide solution according to the invention, the following equipment was used:

(A) A three-liter capacity reaction vessel provided with apparatus for heating the reaction mixture and an agitator for effecting the slow mixing of the contents;

(B) A column (6.2 cm. diameter, 100 cm. high) provided with an overflow pipe and a control valve by means of which the rate of circulation $u$ of the reaction mixture through the column was controllable; the column contained 2 liters of cation exchanger available commercially under the name of IMAC C16P and used in the hydrogen form; there was about 0.60 liter of water above the cation exchanger grains;

(C) A supply tank for an aqueous sodium silicate solution, the $SiO_2$ content of which was 27% by weight and the $Na_2O$ content 8% by weight; and (D) A small pump to feed the reaction mixture from the reaction vessel to the top of the column.

The column and the conduits contained a total of 1600 cc. $H_2O$. 700 cc. $H_2O$ was initially placed in the reaction vessel, hence $G_o$ was 2300 g. in the above equation $$\left(\frac{dc}{dt}\right)_{t=0} = \frac{a.V}{G_o}$$

The water was circulated at a rate of 100 g. per minute through the column, and the water in the reaction vessel was heated to 85° C. Introduction of the sodium silicate solution was then started (rate of introduction $V=4.42$ g. per minute), and the temperature in the reaction vessel ($T=85°$ C.) and the rate of circulation ($u=640$ g. per minute) were kept constant. Small samples (10 to 20 g.) of the effluent from the exchanger column were taken at specific intervals of time $t$ measured from the start of the silicate introductions, and these samples were evaporated and dried at 120° C. The specific $N_2$ area (SA) of the resulting samples of silica or silicon dioxide was determined by the B.E.T. method. After 328 minutes, the introduction of sodium silicate solution and the circulation through the column were stopped. The sol remaining in the column was displaced therefrom with 500 cc. of $H_2O$ and added to the rest of the sol.

The numbers of particles $n$ present in the total system was calculated from the SA determined by the B.E.T. method.

Table A below gives the various process conditions and the pH, the $SiO_2$ content, the SA and the values of $n$ at the different times $t$ counted from the start of the sodium silicate introduction:

TABLE A

| Process conditions | $t$ (min.) | pH | Percent $SiO_2$ | SA (m.²/g.) | $n$ |
|---|---|---|---|---|---|
| $G_o=2,300$ g | 195 | 8.7 | 7.32 | 204 | $8.5 \times 10^{19}$ |
| $u=640$ g./minute | 240 | | 8.52 | 190 | $8.5 \times 10^{19}$ |
| $V=4.42$ g./minute | 300 | | 9.99 | 176 | $8.4 \times 10^{19}$ |
| $T=85°$ C | 328 | 8.4 | 10.5 | 170 | $8.3 \times 10^{19}$ |

NOTE.—See the following:

$$\left(\frac{dc}{dt}\right)_{t=0} = 0.05$$

EXAMPLE II

The process described in Example I was repeated in the same apparatus and under the same process conditions, except that the rate of introduction of the sodium silicate solution V was increased to 11.5 g. per minute with a susbtantially equal rate of circulation ($u=650$ g. per min.). The value of $$\left(\frac{dc}{dt}\right)_{t=0} = \frac{aV}{G_o}$$

was increased from 0.05 to 0.13 in this way under process conditions that were otherwise identical to those in Example 1.

Table B below gives the process conditions and the results after the time $t$. As will be apparent from this table, the increase of $$\frac{aV}{G_o}$$

increased the number of particles forming.

TABLE B

| Process conditions | $t$ (min.) | pH | Percent $SiO_2$ | SA (m.²/g.) | $n$ |
|---|---|---|---|---|---|
| $G_o=2,300$ g | 30 | 9.6 | 4.55 | 433 | $3.3 \times 10^{20}$ |
| $u=650$ g./minute | 50 | | 6.98 | 370 | $3.4 \times 10^{20}$ |
| $V=11.5$ g./minute | 70 | | 8.96 | 318 | $3.0 \times 10^{20}$ |
| $T=85°$ C | 90 | 9.1 | 10.5 | 297 | $3.2 \times 10^{20}$ |

NOTE.—See the following:

$$\left(\frac{dc}{dt}\right)_{t=0} = 0.13$$

EXAMPLE III

The process described in Example II was repeated under substantially the same conditions, except that the rate of circulation $u$ through the column was reduced from 650 g. per min. to 300 g. per min.

The results are shown in Table C below. In comparison with Example II, it will be seen that the reduction of the rate of circulation resulted in the formation of a larger number of sol particles.

TABLE C

| Process conditions | $t$ (min.) | pH | Percent $SiO_2$ | SA (m.²/g.) | $n$ |
|---|---|---|---|---|---|
| $G_o=2,300$ g | 45 | 9.8 | 4.71 | 459 | $5.7 \times 10^{20}$ |
| $u=300$ g./minute | 70 | | 5.70 | 405 | $6.1 \times 10^{20}$ |
| $V=11.3$ g./minute | 95 | | 8.42 | 344 | $5.0 \times 10^{20}$ |
| $T=85°$ C | 120 | 9.4 | 9.98 | 314 | $4.9 \times 10^{20}$ |

NOTE.—See the following:

$$\left(\frac{dc}{dt}\right)_{t=0} = 0.13$$

EXAMPLE IV

The process of Example II was again repeated under substantially the same conditions, except that the rate of circulation through the column was raised from 650 g./min. to 1040 g./min. The results given in Table D below show that this change reduces the number of particles forming.

TABLE D

| Process conditions | $t$ (min.) | pH | Percent $SiO_2$ | SA (m.²/g.) | $n$ |
|---|---|---|---|---|---|
| $G_o=2,300$ g | 45 | 9.4 | 5.07 | 351 | $2.6 \times 10^{19}$ |
| $u=1040$ g./minute | 70 | | 7.30 | 296 | $2.4 \times 10^{19}$ |
| $V=11.4$ g./minute | 95 | | 8.87 | 273 | $2.6 \times 10^{19}$ |
| $T=85°$ C | 120 | 9.1 | 10.4 | 243 | $2.4 \times 10^{19}$ |

NOTE.—See the following:

$$\left(\frac{dc}{dt}\right)_{t=0} = 0.13$$

The influence of the temperature of the reaction mixture upon the number of particles forming is illustrated by the following examples:

EXAMPLE V

The procedure described in the above examples was repeated under the process conditions given in Table E below. The temperature in the reaction vessel was maintained at 60° C. Table E also gives the results obtained:

TABLE E

| Process conditions | $t$ (min.) | pH | Percent $SiO_2$ | SA (m.²/g.) | $n$ |
|---|---|---|---|---|---|
| $G_o=2,300$ g | 80 | 9.3 | 6.01 | 534 | $11 \times 10^{20}$ |
| $u=650$ g./minute | 110 | | 7.72 | 518 | $14 \times 10^{20}$ |
| $V=7.93$ g./minute | 140 | | 9.11 | 497 | $16 \times 10^{20}$ |
| $T=60°$ C | 175 | 7.9 | 10.6 | 461 | $16 \times 10^{20}$ |

NOTE.—See the following:

$$\left(\frac{dc}{dt}\right)_{t=0} = 0.09$$

EXAMPLE VI

The process of Example V was repeated under substantially the same process conditions, but the temperature in the reaction vessel was raised to 85° C. The results obtained are given in Table F below:

TABLE F

| Process conditions | $t$ (min.) | pH | Percent $SiO_2$ | SA (m.²/g.) | $n$ |
|---|---|---|---|---|---|
| $G_o=2,300$ g | 80 | 9.6 | 6.1 | | |
| $u=650$ g./minute | 110 | | 7.7 | 275 | $2.0 \times 10^{20}$ |
| $V=8.00$ g./minute | 140 | | 9.1 | 243 | $1.9 \times 10^{20}$ |
| $T=85°$ C | 175 | 9.2 | 10.5 | 229 | $1.9 \times 10^{20}$ |

NOTE.—See the following:

$$\left(\frac{dc}{dt}\right)_{t=0} = 0.09$$

It will be apparent from the results in Tables E and F that an increase of the reaction temperature results in the formation of a reduced number of particles.

EXAMPLE VIII

The process of Example I was repeated, but under the following process conditions:

The predetermined amount of water $G_o$ was 1730 g., the rate of introduction of the sodium silicate solution V was increased to 19.8 g. per minute, the rate of circulation $u$ was 100 g. per minutes, and the temperature in the reaction vessel was 75° C. As a result of the foregoing conditions, the value of $$\left(\frac{dc}{dt}\right)_{t=0} = \frac{aV}{G_o}$$

was increased to 0.34. The results obtained are given in Table G below:

TABLE G

| Process conditions | $t$ (min.) | pH | Percent $SiO_2$ | SA (m.²/g.) | $n$ |
|---|---|---|---|---|---|
| $G_o=1,730$ | 42 | 9.6 | 11.0 | 427 | $7.6 \times 10^{20}$ |
| $u=1,000$ g./minute | 76 | | 15.6 | 351 | $7.6 \times 10^{20}$ |
| $V=19.8$ g./minute | 116 | | 20.2 | 305 | $7.7 \times 10^{20}$ |
| $T=75°$ C | 157 | | 21.6 | 267 | $7.3 \times 10^{20}$ |
| $\left(\frac{dc}{dt}\right)_{t=0}=0.34$ | 187 | 9.2 | 22.6 | 242 | $6.5 \times 10^{20}$ |
| | 233 | | 25.1 | 229 | $6.3 \times 10^{20}$ |

Although a number of illustrative examples of the invention have been described in detail herein, it is to be noted that the invention is not limited to those precise examples, and that various changes and modifications may be effected therein by one skilled in the art without departing from the scope or spirit of the invention.

What is claimed is:

1. In the process for preparing a stable concentrated colloidal silicon dioxide solution by continuously mixing an aqueous alkali-metal silicate solution and an aqueous silicon dioxide sol to provide a reaction mixture, passing the reaction mixture continuously through an ion exchanger, mixing the silicon dioxide sol effluent from the ion exchanger with new alkali-metal silicate solution to replenish the reaction mixture, and repeating the cycle one or more times until the effluent from the ion exchanger has reached the required silicon dioxide content; the improvement comprising employing said ion exchanger in the hydrogen form, starting up said process by adding said alkali-metal silicate solution continuously and, at least initially, at a constant rate to a predetermined quantity of water while maintaining the temperatures of said alkali-metal silicate solution, said water and the resulting mixture in the range between 60 and 100° C., and passing said resulting mixture continuously and, at least initially, at a constant rate through the ion exchanger to provide, as the effluent from the latter, the aqueous silicon dioxide sol which is continuously mixed with said alkali-metal silicate solution to constitute said reaction mixture, adjusting the pH of said reaction mixture to a value in the range from 6 to 10 by means of said alkali-metal silicate solution introduced continuously therein, maintaining the temperature of said reaction mixture in the range between 60 and 100° C., and selecting the silicon dioxide content and the rate of continuous introduction of said alkali-metal silicate solution and said predetermined quantity of water so that the rate of increase of the silicon dioxide concentration in said effluent in percent by weight per minute is at all times in the range between 0.03 and 1.0.

2. The process according to claim 1, wherein $$\frac{a.V}{G_o}$$

has said value in the range between 0.03 and 1.0, with $a$ being the silicon dioxide content in percent by weight of the alkali-metal silicate solution $V$ being the rate in g. per minute at which the alkali-metal silicate solution is continuously introduced, and $G_o$ being said predetermined quantity of water by weight in grams.

3. The process according to claim 2, in which said value of $$\frac{a.V}{G_o}$$

is in the range between 0.05 and 0.5.

4. The process according to claim 1, in which said rates at which the alkali-metal silicate solution is introduced and the mixture is passed through the ion exchanger, respectively, are kept constant until the silicon dioxide content of the effluent from the ion exchanger has attained a value of approximately 4 percent by weight.

5. The process according to claim 1, in which said temperature of the reaction mixture is maintained in the range between 75 and 90° C.

6. The process according to claim 1, in which said alkali-metal silicate solution is sodium silicate solution.

7. The process according to claim 6, in which said sodium silicate solution contains approximately 27 percent by weight $SiO_2$ and approximately 8 percent by weight $Na_2O$.

References Cited
UNITED STATES PATENTS

| | | | |
|---|---|---|---|
| 2,650,200 | 8/1953 | Iler et al. | 252—313 S |
| 2,573,743 | 11/1951 | Trail | 252—313 S |
| 2,727,008 | 12/1955 | Iler | 252—313 S |

RICHARD D. LOVERING, Primary Examiner

U.S. Cl. X.R.

252—314